July 8, 1924.

O. PILLAR

GROOVE CUTTING MACHINE

Filed April 5, 1922    2 Sheets-Sheet 1

1,500,637

Inventor
OSCAR PILLAR

Harry C. Schroeder
Attorney

July 8, 1924.
O. PILLAR
1,500,637
GROOVE CUTTING MACHINE
Filed April 5, 1922    2 Sheets-Sheet 2
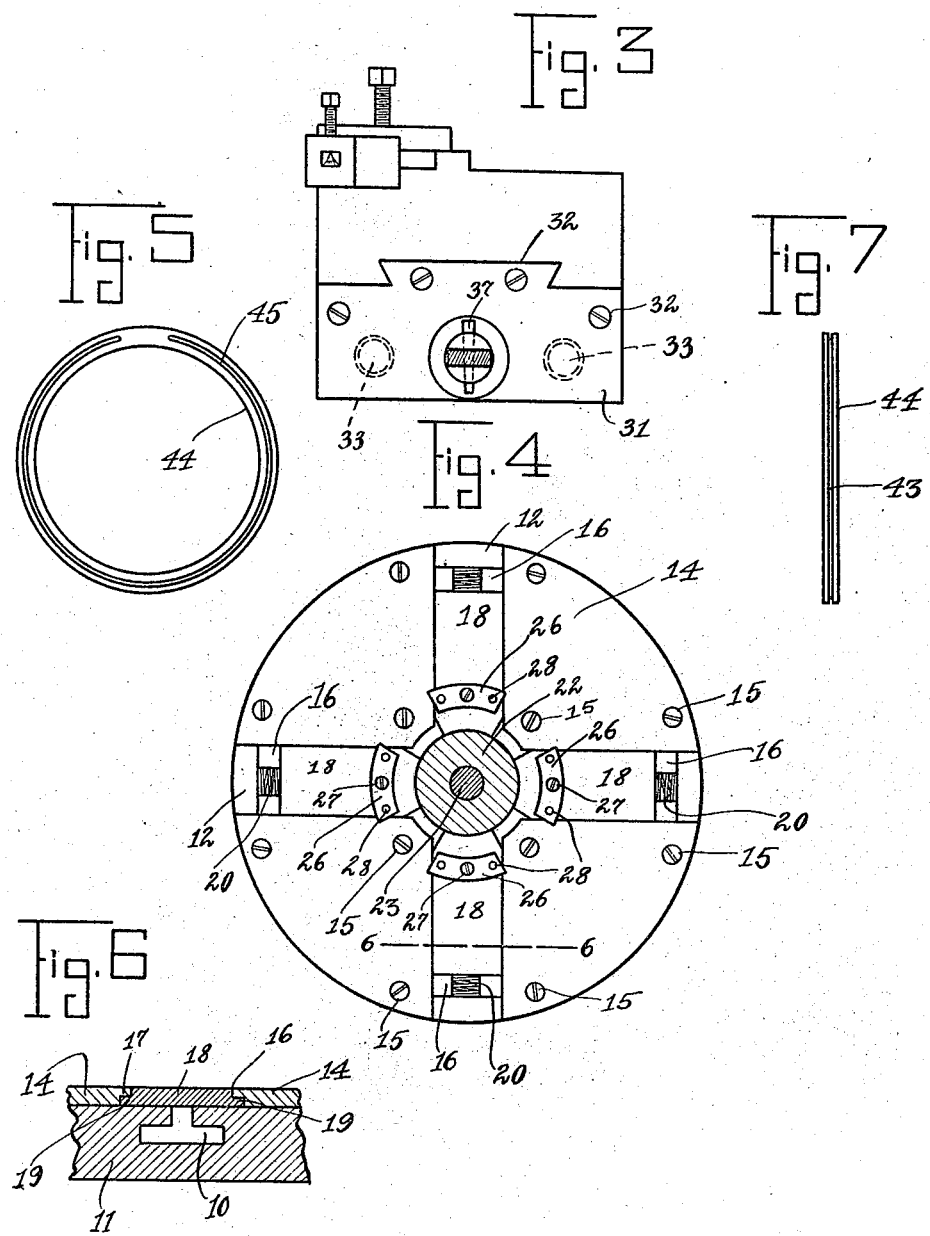
Inventor
OSCAR PILLAR
Harry C. Schroeder
Attorney Patented July 8, 1924.

1,500,637

UNITED STATES PATENT OFFICE.

OSCAR PILLAR, OF OAKLAND, CALIFORNIA, ASSIGNOR TO VACUUM GROOVE PISTON RING CORPORATION, OF OAKLAND, CALIFORNIA, A CORPORATION OF CALIFORNIA.

GROOVE-CUTTING MACHINE.

Application filed April 5, 1922. Serial No. 549,951.

*To all whom it may concern:*

Be it known that I, OSCAR PILLAR, a citizen of the United States, residing at Oakland, in the county of Alameda and State of California, have invented certain new and useful Improvements in Groove-Cutting Machines, of which the following is a specification.

My invention is a machine for cutting grooves in the face and in the side of piston rings, which will cut both of said grooves in a piston ring at the same time and will cut the side groove nearly all the way around the ring so that the ring may be afterwards split between the ends of said groove.

Referring to the annexed drawing in which my invention is illustrated and which forms a part of this specification:

Figure 3 is a front view of the side groove tool holding device.

Figure 4 is a side view partly in section of the piston ring chuck.

Figure 5 is a plan view of a piston ring showing a groove cut therein by my machine.

Figure 6 is a fragmentary sectional view of the chuck taken on line 6—6 of Figure 4.

Figure 7 is a side view of a piston ring showing a groove cut therein by my machine.

Figure 1:
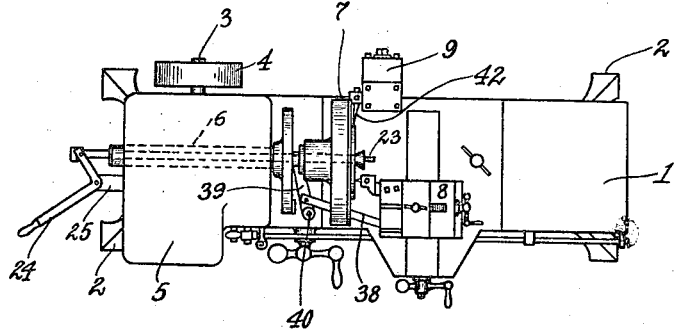
Figure 1 is a plan view of my invention.
Figure 2:
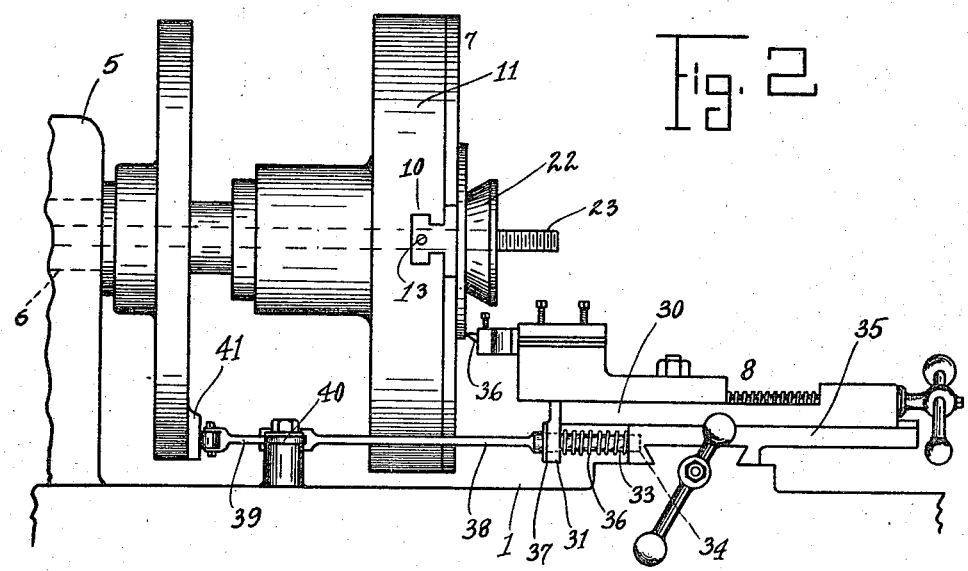
Figure 2 is a side elevation of my invention.

My invention is embodied in a standard lathe, as shown in Figures 1 and 2, including a frame 1 mounted on legs 2, a drive shaft 3 journaled on said frame, a drive pulley 4 secured on said shaft, a gearing head 5 on the left end of said frame, a chuck shaft 6, a chuck 7 mounted on said shaft, a tool holder 8 mounted on said frame at the right of said chuck, and a side cutting attachment 9 mounted on the rear of said frame slightly forwardly of said chuck.

My invention contemplates certain improvements in the chuck of said lathe and means for automatically moving the tool which cuts the side groove, into and out of contact with the side of the piston ring held by the chuck to form a break in the continuity of said groove through which break the rings split.

In applying my improvements to the chuck 7 I first remove the standard jaws from the jaw grooves 10 in the head 11 of the chuck and plugs 12 are secured in the outer ends of said grooves by screws 13. Plates 14 are secured to the face of the chuck head 11 by screws 15 which plates are of such size and shape as to provide slide grooves 16 between their opposite edges, which grooves extend radially of the chuck in front of the chuck grooves 10. The groove edges of said plates are formed with undercut rabbets 17 and radial plate slides 18 are fitted in said grooves respectively, the side edges of which slides are formed with overcut rabbets 19 which coact with the rabbets 17 to hold the slides 18 in the chuck in the grooves 16. Springs 20 are interposed between the outer ends of the slides 18 and the plugs 12 which urge said slides inwardly against a cone 22 which screws on one end of a threaded rod 23, which rod is slidable in and extends through the chuck 7 and chuck shaft 6 and is connected at its other end to a lever 24 pivoted on a bracket 25 on the left end of the lathe frame 1. On the face of the slides 18 near their inner ends are secured arcuate jaws 26 by means of screws 27 and pins 28, said screws extending through said jaws midway of their ends and said pins extending through the jaws near their ends.

To the left end of the longitudinal slide 30 of the tool holder 8 is secured a depending plate 31 by means of screws 32 from the lower part of which plate studs 33 extend to the right into sockets 34 in the left edge of the transverse slide 35 of said tool holder. Springs 36 surround the studs 33 between the left edge of slide 35 and the plate 31 which springs normally hold the slide 30 in position with the peripheral groove cutting tool 36 in cutting engagement with the peripheral of the piston ring to cut the peripheral groove therein. To the left side of the plate 31 is pivotally connected by means of a pin 37 one end of a pitman 38, the other end of which pitman being pivotally connected to a cam engaging arm 39 pivoted on the lathe frame 1 at 40, which arm engages a cam 41 secured on the chuck shaft 6 between the chuck 7 and the gearing head 5. The tool 42 held in the side cutting attachment 9 cuts the groove 43 in the face of the ring 44.

The piston ring is held in the chuck 7 by the jaws 26 which are spread against the inside of the ring by the engagement of cone 22 with the inner ends of the slides 18, which cone is drawn against said ends of said slides by means of the lever 24 and held in engagement therewith by the friction between the rod 23 and the inner surface of the chuck shaft 6.

The tool 36 cuts the side groove 45 in the piston ring nearly all the way around the ring, the tool being withdrawn from engagement with the top of the ring for a short interval by the cam 41 engaging the arm 39, and forcing the pitman 38 and slide 30 to the right, and then allowed by the cam to be projected into engagement with the ring by the springs 36, thus leaving a break in the continuity of the groove and a plain surface 46 between the ends of said groove, through which break and surface the ring is later split.

Having described my invention, I claim:

In a machine as disclosed, a chuck shaft, a chuck on said shaft for holding the piston ring, a lathe tool holder, a plate secured to the end of the longitudinal slide of said tool holder, a spring engaging said tool holder and said plate for holding said slide in position with the tool in said holder in engagement with the side of the ring, a pitman connected at one end to said plate, a cam lever connected to the other end of said pitman, and a cam on said chuck shaft for engaging said cam arm to move said slide to withdraw said tool for a short interval from the ring to form a short break in the continuity of the groove cut in the ring by said tool.

In testimony whereof I affix my signature.

OSCAR PILLAR.